Feb. 27, 1962 F. M. WOOD 3,023,312
RADIOACTIVE PIPE THICKNESS MEASUREMENT
Filed Oct. 3, 1957 5 Sheets-Sheet 3
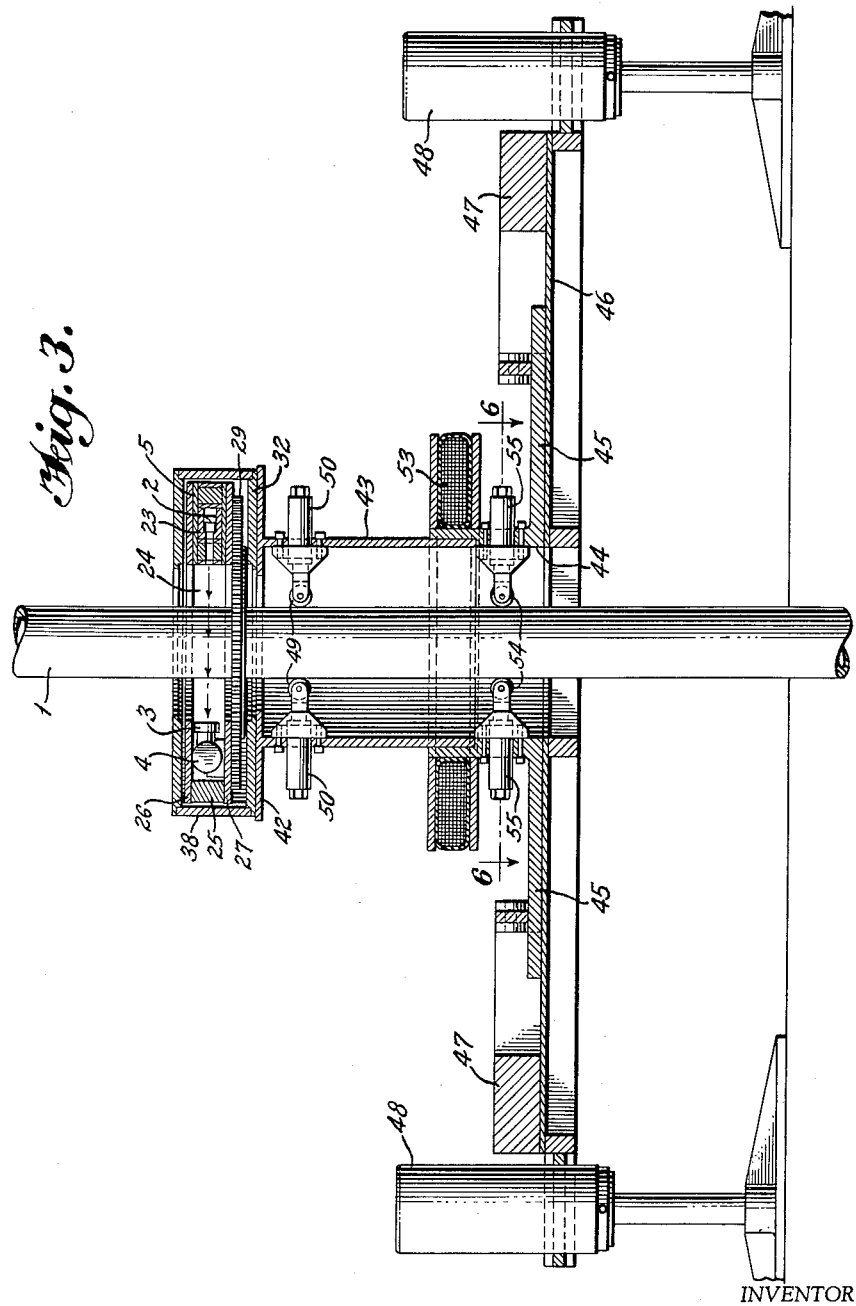
INVENTOR
*Fenton M. Wood*
BY *Arnold and Stidham*
ATTORNEYS

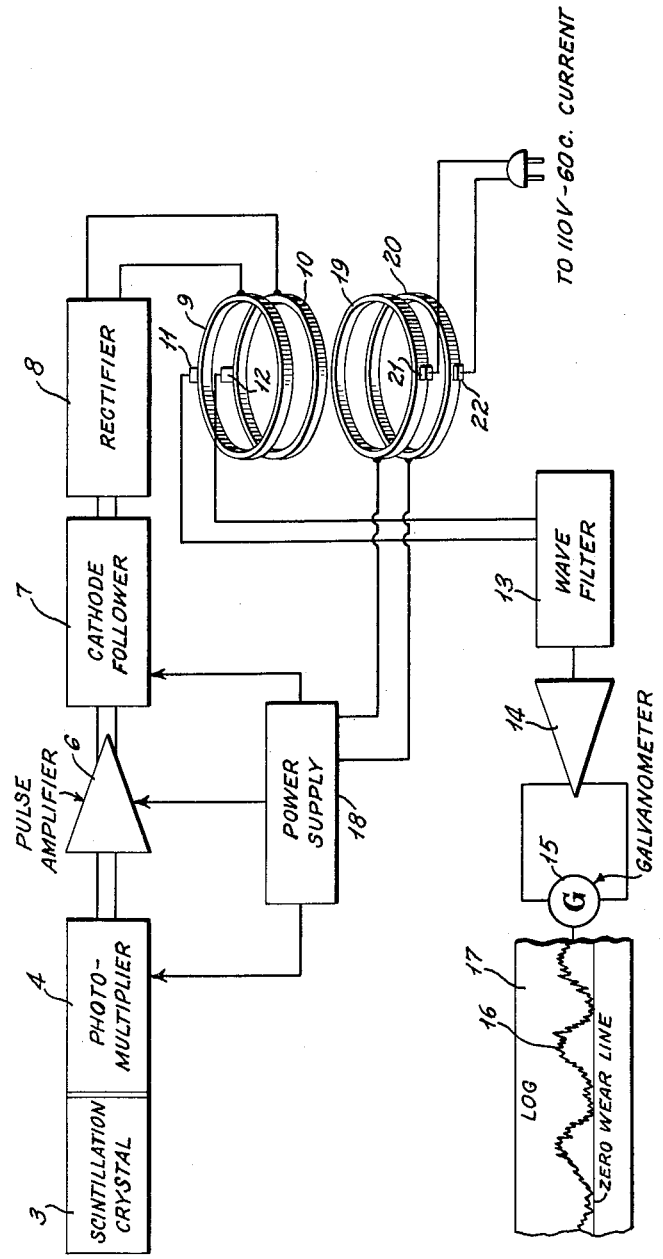

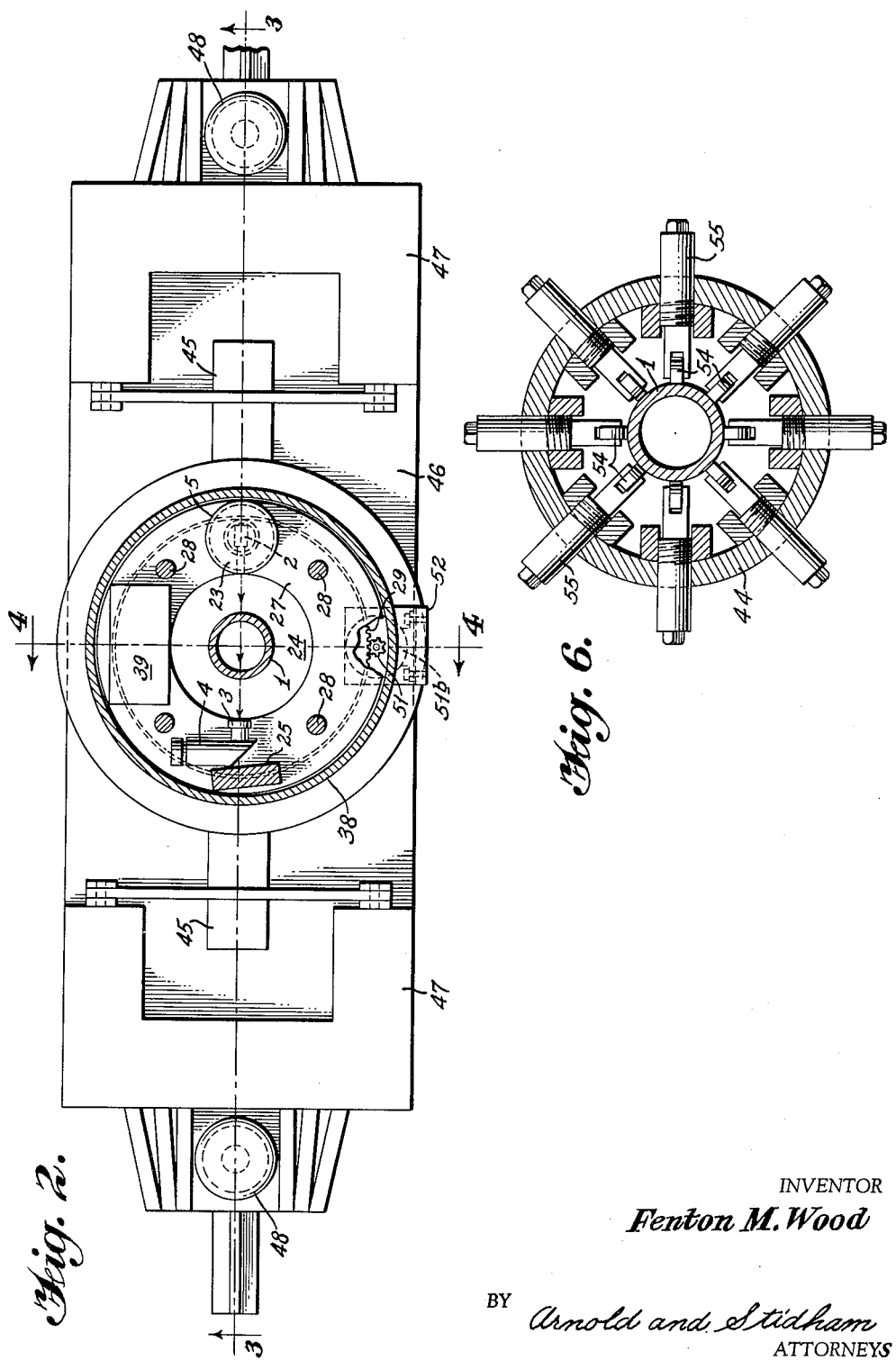

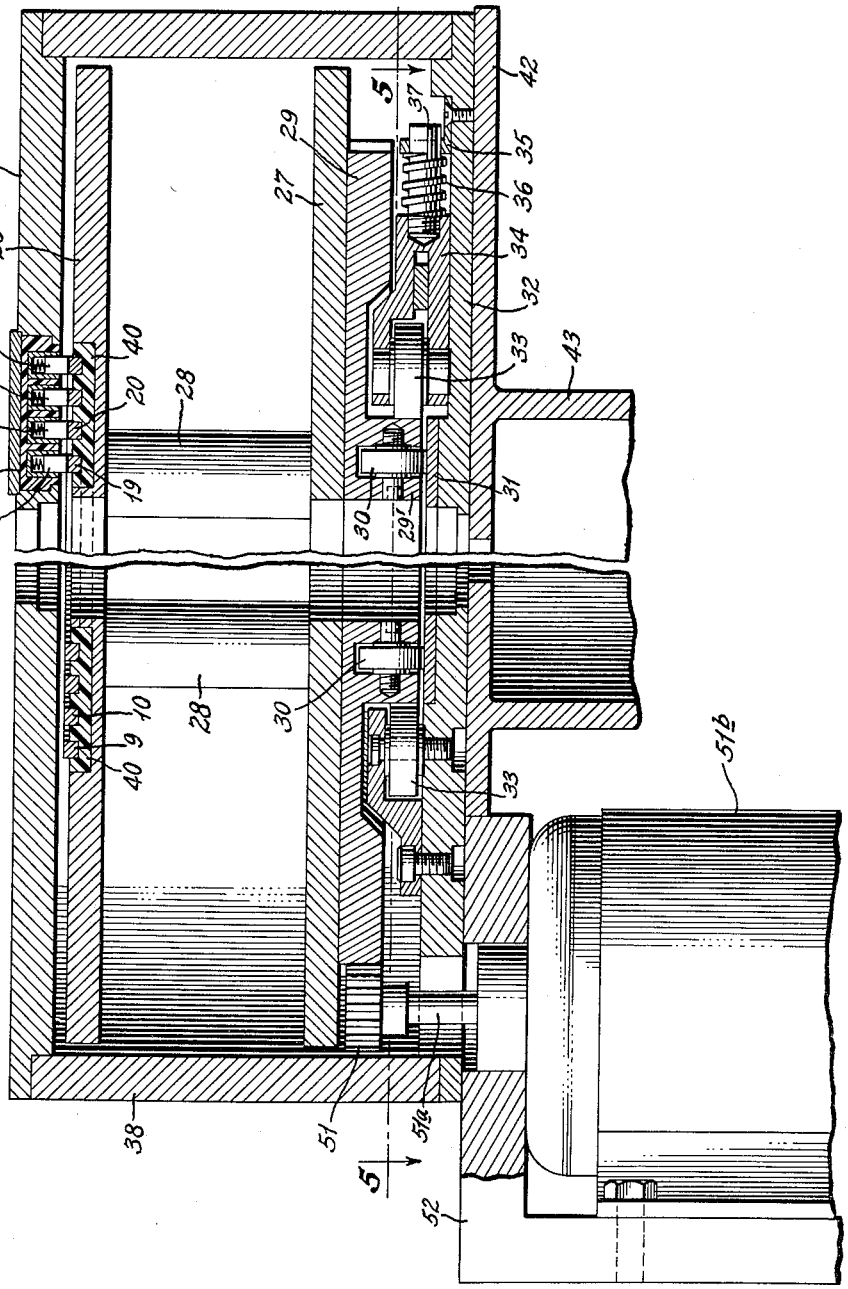

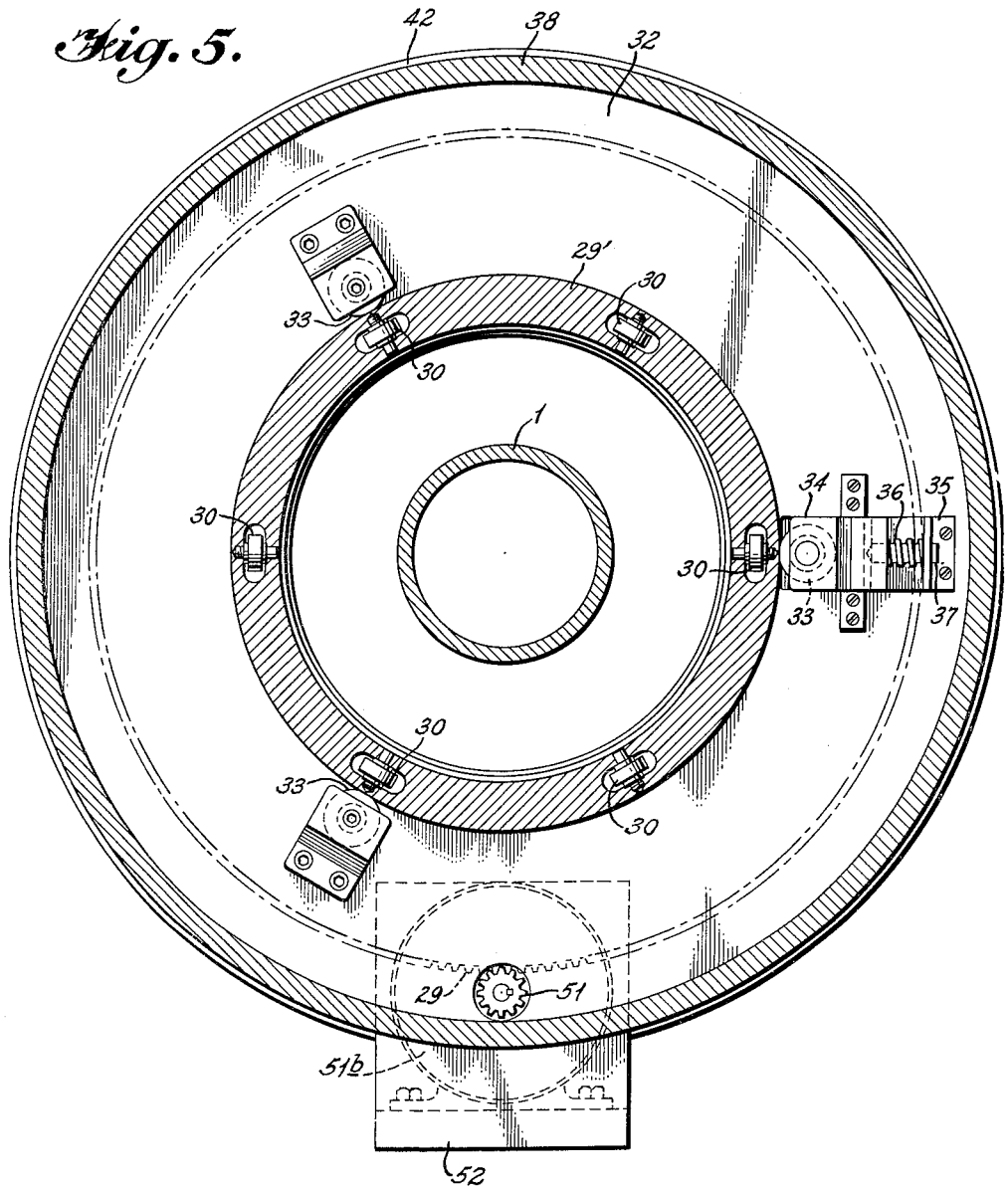

United States Patent Office 3,023,312
Patented Feb. 27, 1962

3,023,312
RADIOACTIVE PIPE THICKNESS
MEASUREMENT
Fenton M. Wood, Houston, Tex., assignor to Tuboscope Company, Harris County, Tex., a corporation of Delaware
Filed Oct. 3, 1957, Ser. No. 687,995
12 Claims. (Cl. 250—52)

This invention relates to detection of pipe thickness, and more particularly to indication of variation of the wall thickness of drill pipe.

Oil well drill pipe is subjected to a very high degree of abrasive wear during drilling operations. This wear is even higher when drilling is proceeding in a crooked hole. The wear is frequently of such magnitude as to cause removal of portions of the outside wall of the drill pipe, so that the pipe becomes thin over a considerable area and is in danger of breaking. Since it is quite difficult to recover pipe and a drill bit if the pipe parts during a drilling operation, it is desirable to measure the thickness of the drill pipe before any portion of its wall becomes so thin that the pipe is likely to part during operation. Sections of the pipe that are found by this measurement procedure to have excessively thin walls may be removed and replaced, so that the possibility of parting of the pipe during drilling operations can be reduced.

While it has been suggested in the past to measure or indicate the body wall thickness of drill pipe while the pipe is being removed from the well during a bit changing operation, or for any other reason, it is extremely difficult to provide a clear response to thinning of the pipe wall during this operation. Though several different methods of providing such a response have been developed, they have not been entirely satisfactory in that their indications were not sufficiently precise that all dangerously thin sections of pipe could be detected and all satisfactory sections of pipe passed by the measuring apparatus. For instance, it has been proposed that variations in magnetic characteristics of a pipe detected by a suitable coil arrangement be employed as in indication of changes in wall thicknes of the pipe. However, localized cold work spots, such as produced in straightening bent pipe, and variations in metal characteristics, such as produced by changes in heat treatment of different sections of the pipe during its manufacture, are detected by the magnetic measurement, along with changes in body wall thickness. It has also been proposed that changes in positions of mechanical feelers contacting the outer surface of the pipe be used as an indication of thickness changes. However, this system fails to detect thickness changes due to corrosion of the inner surface of the pipe, and, since the feelers must be retractable to allow tool joints to pass between them, they inherently have mechanical play which results in erroneous indications.

The apparatus of the present invention is designed to provide a more accurate indication of variations in body wall thickness of drill pipe as it advances past the apparatus. The present invention avoids the disadvantages of the aforementioned prior systems by providing a detection responsive substantially only to body wall thickness, and without permitting contact between the pipe and the detecting apparatus. It includes a source of radiation and a detector of rays emitted by the source, the source and detector being positioned diametrically opposite each other and facing a central passageway through a carrier mounting the detector and source for rotation. The apparatus also includes means for rotating the carrier so that the source and detector may scan pipe as it advances between them. The detector provides an output voltage, the significant frequencies of which vary at twice the speed of rotation of the carrier. The apparatus therefore also includes means for filtering the output of the detector to select this particular frequency signal, and means for indicating the output of the filter.

The invention will now be more fully described in conjunction with a preferred embodiment of apparatus therefor.

In the accompanying drawings,

FIG. 1 is a schematic diagram of the electrical components of the apparatus;

FIG. 2 is a plan view, partly in section, of the apparatus of the invention;

FIG. 3 is a vertical sectional view taken along line 3—3 of FIG. 2;

FIG. 4 is a sectional view taken along line 4—4 of FIG. 2, on an enlarged scale;

FIG. 5 is a sectional view taken along line 5—5 of FIG. 4; and

FIG. 6 is a sectional view taken along line 6—6 of FIG. 3, showing the centralizing apparatus of the invention.

In the drawings, referring first to FIG. 3 for a general description of the invention, the drill pipe 1 is intended to be moved along its length by apparatus not disclosed, as is conventional in, for instance, bit changing operations. It will be evident, however, that the detecting apparatus could be moved lengthwise of the pipe. The apparatus of the invention includes a gamma ray source 2 mounted diametrically opposite a scintillation crystal 3 and a photomultiplier tube 4. The crystal 3 and photomultiplier 4, together with the radioactive source 2, are mounted by a carrier 5 which is rotatable with respect to the pipe 1.

Referring next to FIG. 1, the scintillation crystal 3 is positioned closely adjacent the photomultiplier 4 so that light flashes caused by radiations striking the crystal will reach the photomultiplier and be converted therein into an electrical voltage. The output of the photomultiplier varies in amplitude with the number and intensity of rays striking the crystal, and it thereby varies with the thickness of the pipe, since the thicker the pipe, the more gamma rays that it scatters or absorbs. The photomultiplier output is supplied to a conventional pulse amplifier 6 whose output in turn is supplied to a cathode follower 7. The output of the cathode follower is rectified in a rectifier 8 to provide a D.-C. voltage of amplitude varying with the number of rays reaching the crystal 3. The rectifier 8 is connected to a pair of slip rings 9 and 10 on which brushes 11 and 12 bear. The brushes are connected across a wave filter 13 which is designed to select a narrow band of frequencies and supply that narrow band to an amplifier 14. In a preferred embodiment of the apparatus disclosed, the source and detector were rotated at a speed of 60 revolutions per minute, and the wave filter was a conventional low pass filter designed to discriminate against all frequencies above a frequency slightly higher than two cycles per second. Since the source and detector scan each angular portion of the pipe twice during each rotation, it will be evident that any two cycles per second variation in voltage will represent variation in thickness of the pipe. The output of amplifier 14 is supplied to a pen-type galvanometer 15 which forms a graph 16 on a continuously moving log chart 17. The diagrammatic showing of graph 16 in FIG. 1 indicates the relative wear or relative thickness of the various sections of the pipe as it passes between the source and the crystal. Since the source and detector pass each angular portion of the pipe, both uniform and localized thinning are detected.

The scintillation crystal 3, the photomultiplier 4, pulse amplifier 6, cathode follower 7, and rectifier 8 are all mounted with the source on carrier 5 and together function as a detector. The carrier also mounts a power supply 18 which provides operating voltages for the various electrical elements of the system. Power supply 18 is itself supplied with power through connection to slip rings 19 and 20 which in turn are contacted by brushes 21 and 22. Brushes 21 and 22 are connected to the usual 110 volt power supply mains.

The apparatus so far described in schematic form will obviously operate to scan the pipe as it moves along its length between the radiation source and the crystal. Though the voltage output from the detector will obviously vary in magnitude in accordance with many factors, these factors will all normally be such as to cause voltage changes of frequencies higher than the wave filter frequency. By selecting the wave filter to discriminate against all frequencies but D.-C. and those varying in accordance with the speed of rotation of the detection system, extraneous voltages, or noise voltages, can be eliminated, so that graph 16 will provide a clear indication of the relative thickness of the pipe. It is obvious that the graph may be moved at the same speed as the movement of the pipe, or at some sub-multiple thereof, so that indications of wear on the graph may be related to individual sections of the pipe. The wave filter is preferably of the R-C type or of the R-L-C type and is designed to cut off all frequencies above $2n$, where $n$ is the speed of rotation of the detection system per second.

Referring again to FIG. 3, together with FIG. 2 and FIGS. 4 through 6, the gamma ray source 2 is surrounded by a lead shield 23 having a passageway extending between the source and a central passageway 24 through carrier 5. Passageway 24 is designed to permit the pipe 1 to be moved through the carrier. The lead shield 23 collimates the beam of gamma ray from source 2 so as to confine it to a narrow beam directed along a diameter of pipe 1. The crystal 3 and photomultiplier 4 are themselves shielded by a lead block 25 mounted outwardly thereof to stop any rays which pass beyond these elements.

Carrier 5 is composed of an upper and a lower plate 26 and 27 which are held in spaced relationship by posts 28 (FIG. 4). The lower plate 27 is mounted on a gear 29 which carries a plurality of arcuately spaced bearing rollers 30 near its inner portion, the rollers 30 being designed to ride on a bearing plate 31 carried by table 32. The table also carries a plurality of bearing rollers 33 which are designed to bear against the outer surface of a lower flange 29′ of the gear member 29, and thereby to maintain the gear and the carrier in location centralized with respect to the table 32. One of the rollers 33 is urged toward the carrier to force the carrier against the other rollers through mounting of that roller in a movable carriage 34 which is urged away from a stop 35 fixed to table 32, by a spring 36 surrounding a stud 37 threaded to the carriage 34.

The table 32 carries a cylindrical upstanding wall portion 38 which in turn carries a fixed plate 38′. The table 32, the wall 38, and the plate 38′ form a housing for the rotatable carrier. A smaller housing 39 mounted in carrier 5 encloses the amplifier 6, cathode follower 7, rectifier 8 and power supply 18.

The upper plate 26 of the carrier 5 has mounted thereon in a suitable insulating layer 40 the slip rings 9, 10 and 19, 20. Brushes 11, 12 and 21, 22 are mounted in a suitable insulated block 41 on the upper plate 38′ and are urged into contact with their respective slip rings by suitable spring means.

The table 32 is itself mounted on a flat table portion 42 of a standard or stanchion 43. The stanchion is supported by an upstanding collar 44 which has bars 45 extending laterally therefrom which rest on a rig table 46. The bars 45 are held with respect to the rig table by holdown bars 47. The rig table is itself supported from the earth or other suitable supporting means by air jacks 48.

Since there is some tendency for the pipe to whip as it is withdrawn from the well, the apparatus is also provided with centralizing means including a plurality of spring-pressed rollers 49 spaced around stanchion 43 and extending inwardly thereof. The rollers are urged by spring members internally of their cartridges 50 into contact with the outer wall of the pipe, so as to keep the pipe central with respect to the carrier 5.

Gear 29 of the carrier 5 is rotated by a pinion gear 51 driven by the shaft 51a of an electric motor 51b. Motor 51b is supported by a bracket 52 mounted on the lower side of the stanchion 43 and is designed to drive pinion 51 at a constant speed.

The apparatus may also be provided with a device for indicating pits or defects in the wall of the pipe, including an electrical coil 53 surrounding stanchion 43. Since this apparatus forms no part of the present invention, it need not be further explained.

The rig collar 44 is also preferably provided with centralizing means similar to those on the stanchion, and consisting of rollers 54 spring-urged into contact with the pipe through springs in their cartridges 55.

In operation of the apparatus above described, as pipe 1 is pulled through the central passage 24 in the carrier 5, motor 51b rotates the carrier through pinion 51 and gear 29, at constant speed. The source and detector are thereby rotated around the pipe as it passes between them and scans the pipe so that the crystal 3 receives at any instant a number and intensity of rays determined by, and varying inversely with, the thickness of the pipe section between the source and the crystal. The photomultiplier 4 provides an output voltage which varies with the number of rays reaching the crystal at any instant, and this voltage is amplified and rectified. The rectified voltage is filtered to remove frequencies substantially above $2n$ cycles per second, where $n$ is the speed of rotation of the carrier, in revolutions per second, and the selected band of frequencies is amplified again and supplied to a galvanometer-recorder. The record obtained with the recorder has already been described. It will be evident that the record chart is preferably moved in synchronism with movement of the pipe through the detecting apparatus, as has been explained.

A preferred embodiment of the apparatus of the invention has been described above in conjunction with drawings showing that embodiment. It will be evident that many minor changes could be made in that apparatus without departure from the scope of the invention. For instance, a Geiger-type tube or an ionization chamber could be substituted for the scintillation crystal and photomultiplier. The invention therefore is not to be considered limited to the particular embodiment described but rather only by the scope of the appended claims.

I claim:

1. Apparatus for detecting the wall thickness of pipe comprising a radioactive source, a detector of radiations from the source operable to transduce the number and intensity of rays reaching it into a voltage of magnitude varying therewith, a carrier for the source and the detector having a central passageway through which the pipe may pass, said source and detector being mounted diametrically opposite each other whereby radiation from said source will pass through both walls of pipe in said passageway in route to said detector, means for rotating said carrier to cause the source and detector to helically scan advancing pipe, and means for indicating the output of said detector.

2. The apparatus of claim 1 in which the source emits gamma rays and the detector includes scintillation means and a photomultiplier responsive to scintillations from said scintillation means.

3. The apparatus of claim 2 including a shield of high density material surrounding the gamma ray source and having a small passage communicating between the source and said central passageway.

4. Apparatus for detecting the thickness of axially advancing pipe comprising a radioactive source, a detector of radiations from the source operable to produce an output voltage having a magnitude varying with the number and intensity of rays reaching the detector, a carrier for the source and the detector having a central passageway through which the pipe may pass and mounted for continuous rotation around said central passageway, said source and detector being mounted diametrically opposite each other, means for rotating said carrier to cause the source and detector to helically scan advancing pipe, means connected to said detector for selecting a narrow band of frequencies containing a signal of frequency twice the frequency of carrier rotation, and means responsive to the output of said selecting means for indicating the magnitude of said output.

5. The apparatus of claim 4 in which said carrier is rotatable at a speed of $n$ r.p.s. and said selecting means is a low pass filter having a cut-off above two $n$ cycles per second.

6. The apparatus of claim 5 including centralizing means for maintaining the carrier concentric with respect to the advancing pipe.

7. The apparatus of claim 4 including slip rings mounted on the carrier and connected to the output of said detector, and brushes stationary with respect to the slip rings for supplying the detector output to the selecting means.

8. Apparatus for detecting the wall thickness of axially advancing pipe comprising a radioactive source, a detector of radiations from the source operable to produce an output voltage having an amplitude varying with the number and intensity of rays reaching the detector, a table, a carrier rotatably supported from the table, motor and gear means for rotating the carrier at constant speed, said carrier having a central passageway through which the pipe may pass, said source and detector being mounted diametrically opposite each other on said carrier in such manner that rays from the source can reach the detector only after passing through diametrically opposite wall portions of the pipe, a low pass filter having a cut-off slightly above two $n$ cycles per second, where $n$ is the speed of rotation of the carrier, slip rings mounted on the carrier connected to the output of the detector, brushes cooperable with said slip rings and mounted on said table to connect the slip rings to said filter, and indicating means connected to the output of said filter.

9. The apparatus of claim 8 in which said indicating means is a galvanometer-actuated recorder.

10. The apparatus of claim 8 in which said source emits gamma rays and said detector includes a scintillation crystal and a photomultiplier combined together in such fashion that the photomultiplier receives light flashes from the crystal.

11. The apparatus of claim 10 in which said detector further includes an amplifier connected to the output of the photomultiplier, a cathode follower connected to the output of said amplifier, and a rectifier connected to said slip rings.

12. Apparatus for detecting the wall thickness of pipe comprising a radioactive source, a detector of radiations from the source operable to transduce the number and intensity of rays reaching it into a voltage of magnitude varying therewith, a carrier for the source and the detector having a central passageway through which the pipe may pass, said source and detector being mounted diametrically opposite each other, motive means for actuating said carrier to rotate full revolutions continuously around the pipe thereby adapting the source and detector for repetitive scanning of the full 360° circumference of the pipe, and means for indicating the output of said detector.

References Cited in the file of this patent

UNITED STATES PATENTS

| | | |
|---|---|---|
| 1,933,547 | Drake | Nov. 7, 1933 |
| 2,435,985 | Stewart | Feb. 17, 1948 |
| 2,451,572 | Moore | Oct. 19, 1948 |
| 2,486,902 | Wolf | Nov. 1, 1949 |
| 2,525,292 | Fua | Oct. 10, 1950 |
| 2,607,012 | Siebert | Aug. 12, 1952 |
| 2,859,349 | Bradley et al. | Nov. 4, 1958 |
| 2,878,447 | Price et al. | Mar. 17, 1959 |
| 2,885,557 | Kizaur | May 5, 1959 |
| 2,886,772 | Gresham et al. | May 12, 1959 |
| 2,922,887 | Jacobs | Jan. 26, 1960 |

FOREIGN PATENTS

| | | |
|---|---|---|
| 922,795 | Germany | Jan. 24, 1955 |

OTHER REFERENCES

Ohmart: The Use of Gamma Radiation for Density Measurement, represented from the Sept.-Oct., 1957 issue of Nondestructive Testing.